United States Patent [19]
Kawaguchi

[11] Patent Number: 5,156,862
[45] Date of Patent: Oct. 20, 1992

[54] APPARATUS FOR FORMING BENT PORTION OF PIPE IN APPARATUS FOR MAKING BENT PIPE

[75] Inventor: Takahisa Kawaguchi, Chiba, Japan

[73] Assignee: Nemoto Project Industry Co., Ltd., Chiba, Japan

[21] Appl. No.: 682,362

[22] Filed: Apr. 9, 1991

[30] Foreign Application Priority Data

Jul. 18, 1990 [JP] Japan ............................ 2-76447[U]

[51] Int. Cl.⁵ .......................................... B29C 47/22
[52] U.S. Cl. .................................. 425/325; 425/381; 425/465; 425/466
[58] Field of Search ............... 425/190, 325, 381, 465, 425/466, 467; 264/177.1, 285, 209.8; 72/260, 263

[56] References Cited

U.S. PATENT DOCUMENTS

| | | | |
|---|---|---|---|
| 3,601,851 | 8/1971 | Heidlinger | 425/466 |
| 4,137,745 | 2/1979 | Muratov et al. | 72/263 |
| 4,281,978 | 8/1981 | Shigematsu | 425/465 X |
| 4,464,104 | 8/1984 | Gneuss | 425/465 X |
| 4,472,129 | 9/1984 | Siard | 425/465 X |
| 4,547,246 | 10/1985 | Viriyayuthakorn et al. | 264/209.8 X |
| 4,710,114 | 12/1987 | Garner | 425/465 X |
| 4,946,364 | 8/1990 | Wagner et al. | 425/466 X |
| 5,003,806 | 4/1991 | Nemoto | 72/260 |

FOREIGN PATENT DOCUMENTS

| | | |
|---|---|---|
| 0293311 | 11/1988 | European Pat. Off. |
| 1107926 | 5/1961 | Fed. Rep. of Germany |
| 2113054 | 9/1972 | Fed. Rep. of Germany |
| 3505837 | 8/1986 | Fed. Rep. of Germany |
| 3619005 | 12/1987 | Fed. Rep. of Germany |
| 59-123636 | 7/1984 | Japan |
| 312522 | 3/1956 | Switzerland |
| 405682 | 7/1966 | Switzerland |

Primary Examiner—Richard L. Chiesa
Attorney, Agent, or Firm—Sandler, Greenblum & Bernstein

[57] ABSTRACT

A bent pipe forming apparatus is provided for extruding and forming a fluid material into an annular member. The apparatus has a central mandrel and a die defining an annular gap between the mandrel and the die. One of the mandrel and the die is supported to move in a direction perpendicular to an axis of the mandrel. The movable mandrel or die is provided, on its outer periphery, with a guide circular surface integral therewith. An inner movable ring having inner and outer circular peripheries eccentric to each other is rotatably fitted on the guide surface. An outer movable ring having inner and outer circular peripheries eccentric to each other is rotatably fitted on the periphery of the inner movable ring. The outer movable ring is provided with an outer circular periphery which is rotatably fitted in a stationary circular guide surface. Driving motors are provided to independently move the inner and outer movable rings.

16 Claims, 7 Drawing Sheets

APPARATUS FOR FORMING BENT PORTION OF PIPE IN APPARATUS FOR MAKING BENT PIPE

BACKGROUND OF THE INVENTION

1. Field of the Invention

The present invention relates to an improved apparatus for moving a die or a mandrel to form a bent tubular portion in a pipe making machine.

2. Description of Related Art

In a known method for manufacturing a bent pipe, a material in a fluid state, such as a synthetic resin or the like, is extruded to be molded by an extruder to form a straight tubular blank. The blank is then introduced onto a core bar which has a predetermined curved profile and which has a diameter substantially equal to the inner diameter of the straight tubular blank, to reform the same. After that, the reformed blank is withdrawn from the core bar to produce a product. An inflation process is also known in which the tubular blank is introduced in a predetermined shape of a die assembly having an outer die and an intermediate die under pressure to reform the tubular blank, so that the intermediate die is withdrawn to produce a product. Or, the blank is introduced only by the use of the outer die, so that pressurized fluid (air, gas or liquid, etc.) is enclosed in the die to mold the product into a shape corresponding to the outer die.

However, in these known methods, there is a large number of manufacturing steps, including manual operations, that result in decreased operability. Furthermore, since the straight blank is bent to form the bent portion, the outer portion thereof is thinner, and as a result, the thin outer portion tends to be broken by the pressurized fluid. In addition, due to the aging of the core bars and the die assembly, the quality of the products becomes irregular. Furthermore, the manufacturing cost of the dies increases and this leads to expensive products.

The assignee of the present application has proposed a method and apparatus for manufacturing a bent portion of a pipe in Japanese Unexamined Patent Publication No. 59-123636.

In this manufacturing method and apparatus, a fluid material is extruded to form a tubular body, a die or a mandrel is moved in a lateral direction with respect to the direction of extrusion to form the gap between the die and the mandrel to be uniform or not uniform throughout the circumference to thereby form a straight or bent tubular portion.

In principle, any three-dimensional shape of bent tubular body can be obtained by moving the die or the mandrel in accordance with the angles defining the three-dimensional shape. However, in the apparatus disclosed in JUPP 59-123636 mentioned above, one of the die and the mandrel is moved by an external force to vary the gap between the die and the mandrel. Thus, constituent elements of the die and the mandrel or supporting members supporting the constituent elements must be interconnected or fastened with a strong press to prevent possible leakage of the fluid into spaces between the constituent elements or the supporting members thereof. Consequently, the movement of the die or the mandrel requires a very large external drive force, in which case a large driving device with high power and high strength would be required, which is impracticable. Furthermore, a possible backlash of a transmission mechanism of the drive force makes it difficult to precisely control the dimension of the gap between the die and the mandrel, which makes the formation of a desired shape of a bent pipe difficult.

SUMMARY OF THE INVENTION

The primary object of the present invention is to provide a simple and small apparatus for forming any three-dimensional shape of a bent pipe in a bent pipe making machine, in which a die or a mandrel is precisely moved.

To achieve the object mentioned above, according to the present invention, there is provided a bent pipe forming apparatus for extruding and forming a fluid material into an annular member having a central mandrel and a die which defines an annular gap between the mandrel and the die. At least one of the mandrel and the die is supported to move in a direction perpendicular to an axis of the mandrel. The movable mandrel or the die is provided on its outer periphery with a guide surface integral therewith, and an inner movable ring having inner and outer peripheral surfaces eccentric to each other are rotatably fitted on the guide surface. An outer movable ring, having inner and outer peripheral surfaces eccentric to each other, is rotatably fitted on the periphery of the inner movable ring. The outer movable ring is provided with an outer peripheral surface which is rotatably fitted in a stationary guide surface, and a driving device is provided to independently move the inner and outer movable rings.

With this arrangement, the width of the gap between the die and the mandrel in the circumferential direction can be optionally adjusted to be irregular (or uneven) by rotating the inner movable ring having the eccentric inner and outer peripheries and/or the outer movable ring having the eccentric inner and outer peripheries to move the die in the radial direction.

Preferably, there is a phase difference between the inner movable ring and the outer movable ring.

Preferably, rollers are provided between the outer peripheral surface of the movable mandrel or die and the inner movable ring, and between the outer movable ring and the stationary guide surface to ensure a smooth rotation thereof.

Preferably, the rollers are made of hollow circular cylindrical rollers.

The driving device includes operational arms connected to the inner and outer movable rings, respectively, screw rods hinged to the respective operational arms, reduction gear devices, having rotating members in which the screw rods are screwed and a base member which supports the reduction gear devices.

BRIEF DESCRIPTION OF THE DRAWINGS

The invention will be described below in detail with reference to the accompanying drawings, in which.

DESCRIPTION OF THE PREFERRED EMBODIMENTS

A bent pipe making apparatus 1 of the present invention includes a cylindrical die 21 and a mandrel 22 inserted in the die 21. A fluid material is extruded from a gap between inner periphery of the die 21 and the mandrel 22 and is hardened to mold a tubular body. The die 21 or the mandrel 22 is moved by an actuator 2 to vary the gap between the die 21 and the mandrel 22. This is done so that the gap between the die 21 and the mandrel 22 is made irregular (non-uniform) in the circumferential direction of the extrusion opening of the fluid material to form a bent pipe.

In the first embodiment illustrated in FIGS. 1 through 6, the mandrel 22 is immovable and the die 21 is movable. The die 21 is provided on a part of the outer periphery thereof with a guide surface XX of a circular section. The actuator 2 has an inner movable ring 4 which is rotatably fitted on the guide surface XX and which has eccentric inner and outer circular peripheries, an outer movable ring 5 which is rotatably fitted on the inner operation ring 4 and which has eccentric inner and outer peripheries, and an immovable base member 6 having an inner guide peripheral surface YY of a circular section in which the outer movable ring 5 is rotatably fitted. There is a difference of 90 degrees in eccentricity phase between the inner and outer movable rings 4 and 5 in the illustrated embodiment. The inner and outer movable rings 4 and 5 are independently rotated by respective drivers.

Figure 1:
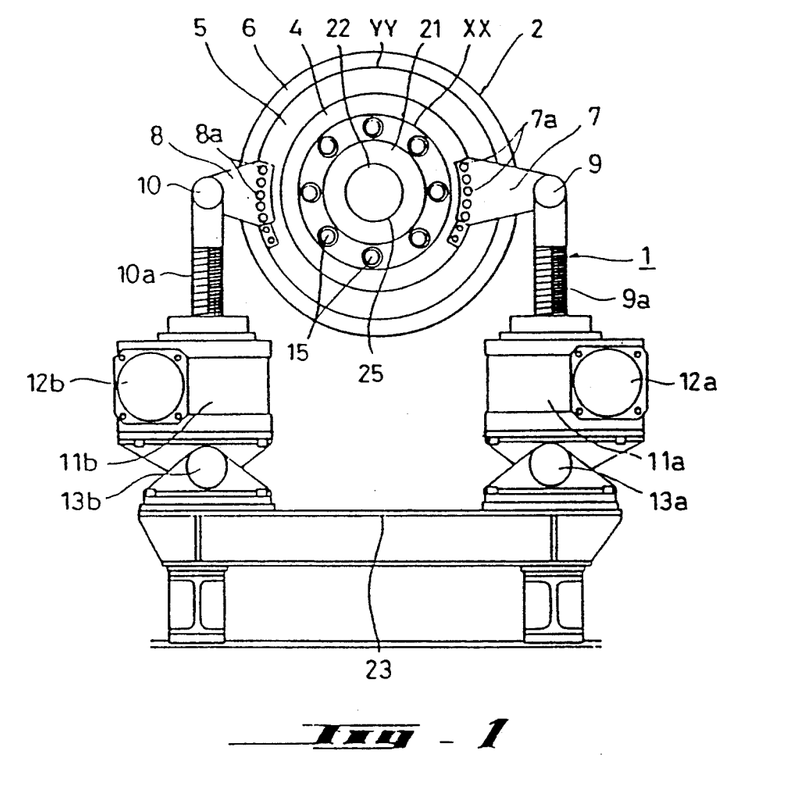
FIG. 1 is a front elevational view of an apparatus for forming a bent pipe according to an embodiment of the present invention.
Figure 2:
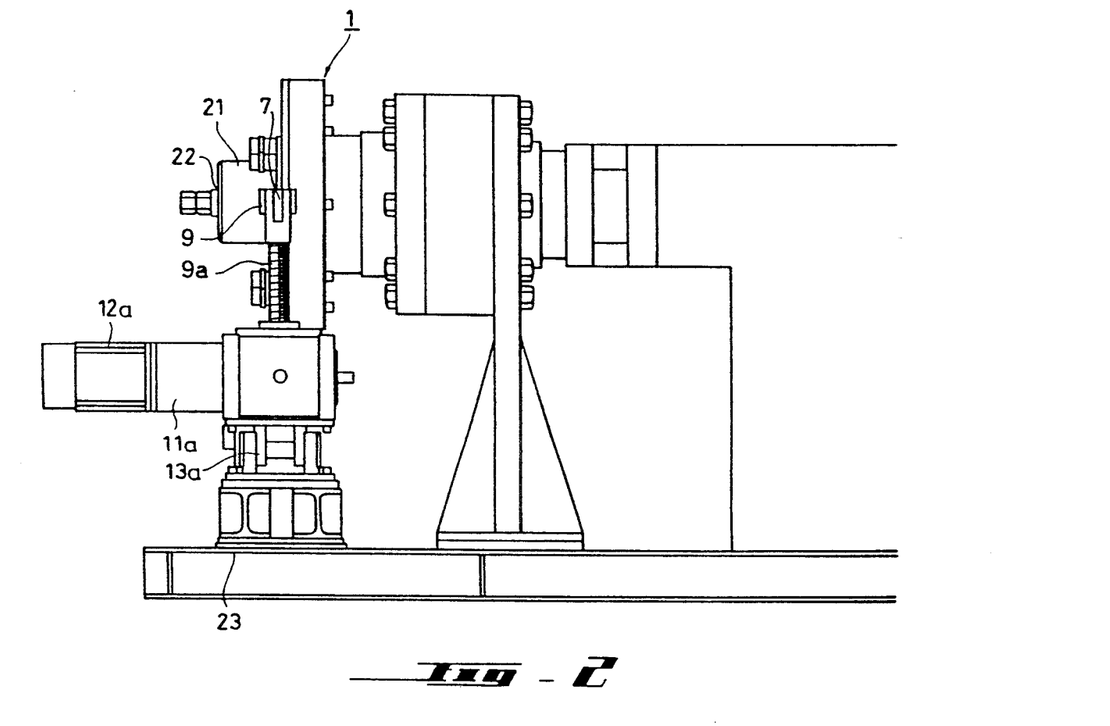
FIG. 2 is a side elevational view of an apparatus shown in FIG. 1.
Figure 3:
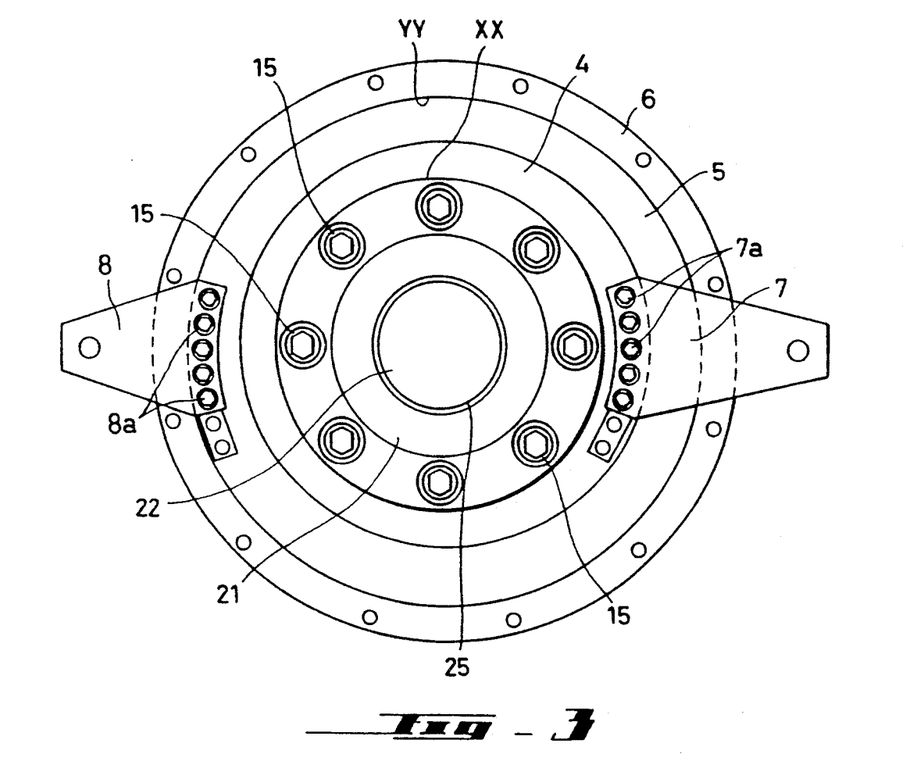
FIG. 3 is an enlarged front elevational view of a main part of an apparatus shown in FIG. 1.

A first driver of the inner movable ring 4 includes a first operation lever 7 secured to the inner movable ring 4 by set screws 7a, a first feed screw rod 9a connected to the first operation lever 7 by a first joint (hinge) 9 (so as to move the first operation lever 7 up and down), and a first reduction gear device 11a connected to the feed screw rod 9a to linearly move the latter up and down.

A second driver of the outer movable ring 5 includes a second operation lever 8 secured to the outer movable ring 5 by set screws 8a, a second feed screw rod 10a connected to the second operation lever 7 by a joint (hinge) 10 (so as to move the second operation lever 8 up and down), and a second reduction gear device 11b connected to the second feed screw rod 10a to linearly move the latter up and down.

The first and second reduction gear devices 11a and 11b are connected to and driven by respective numerical control motors 12a and 12b.

The reduction gear devices 11a and 11b are supported on a bed 23 by first and second supports (pivot shafts) 13a and 13b, respectively.

Figure 6:
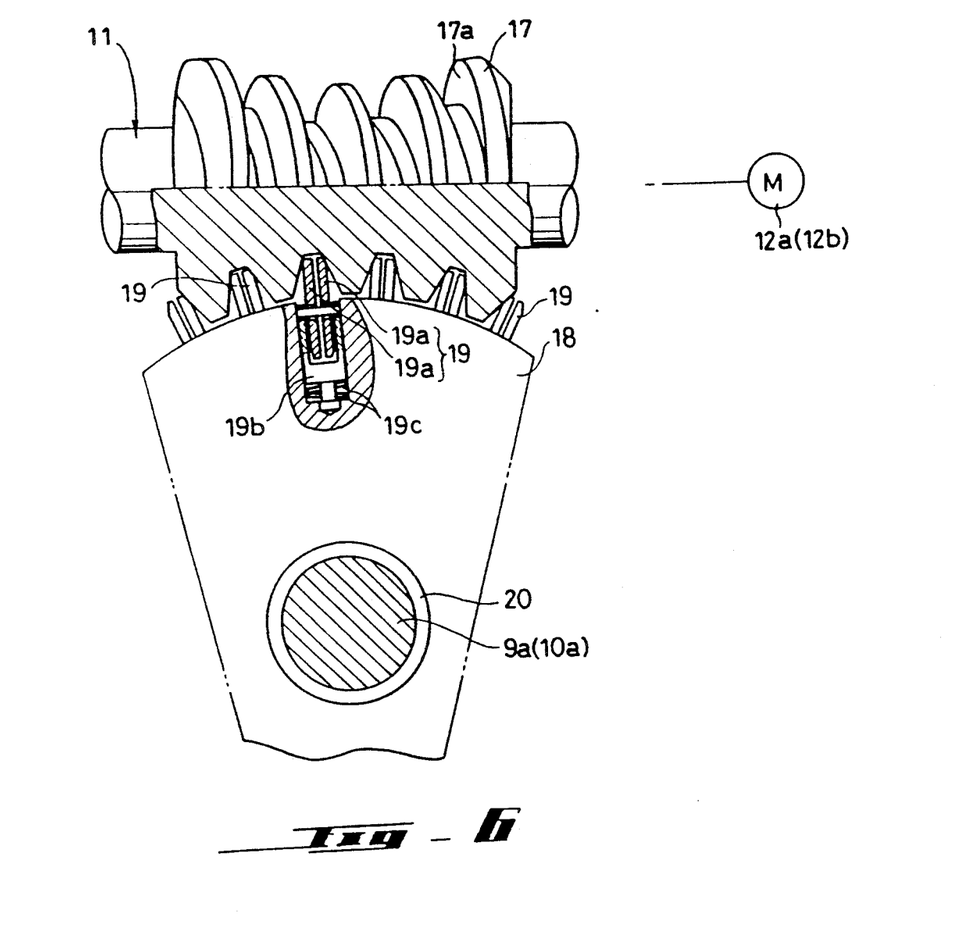
FIG. 6 is a front elevational view of a main part of a speed change gear device according to the present invention; and, FIG. 7 is an enlarged side elevational sectional view of a main part of an apparatus for forming a bent pipe according to another embodiment of the present invention.

Each of the reduction gear devices 11a and 11b includes a worm (driving member) 17 which is connected to and driven by the numerical control motor 12a (or 12b) and a worm wheel (driven member) 18 which is in mesh with the worm 17. The worm wheel 18 is provided, on the outer periphery thereof with teeth in the form of rotors 19 to engage with the grooves 17a of the worm 17. Each of the rotors 19 has a pair of rollers 19a which are independently rotatable, and a holder 19b which rotatably holds the rollers 19a. The holder 19b is biased to project toward the worm 17 by a leaf spring (biasing means) 19c. The feed screw rod 9a (or 10a) is screw-engaged in the worm wheel 18 through a feed screw mechanism 20. The outer diameter of the grooves 17a of the worm 17 increases toward the axial ends 17 is rotated, the independently rotatable rollers 19a of the rotors 19 come into contact with the side surfaces of the grooves 17a of the worm 17. As a result of the different circumferential speeds of the grooves 17a of the worm 17 due to the different diameters thereof, the rollers 19a of the rotors 19 are always in contact with the side surfaces of the associated grooves 17a, and rotates with the circumferential speed of the grooves 17a. Therefore, the worm wheel 18 rotates substantially without backlash and frictional resistance between the worm 17 and the worm wheel 18 upon engagement of the teeth (rotors 19) of the worm wheel 18 in the associated grooves 17a of the worm 17 is minimized. Thus, the non-backlashing feed screw mechanisms 20 can be realized. Consequently, the feed screw rods 9a and 10a are precisely moved in the axial direction.

Figure 4:
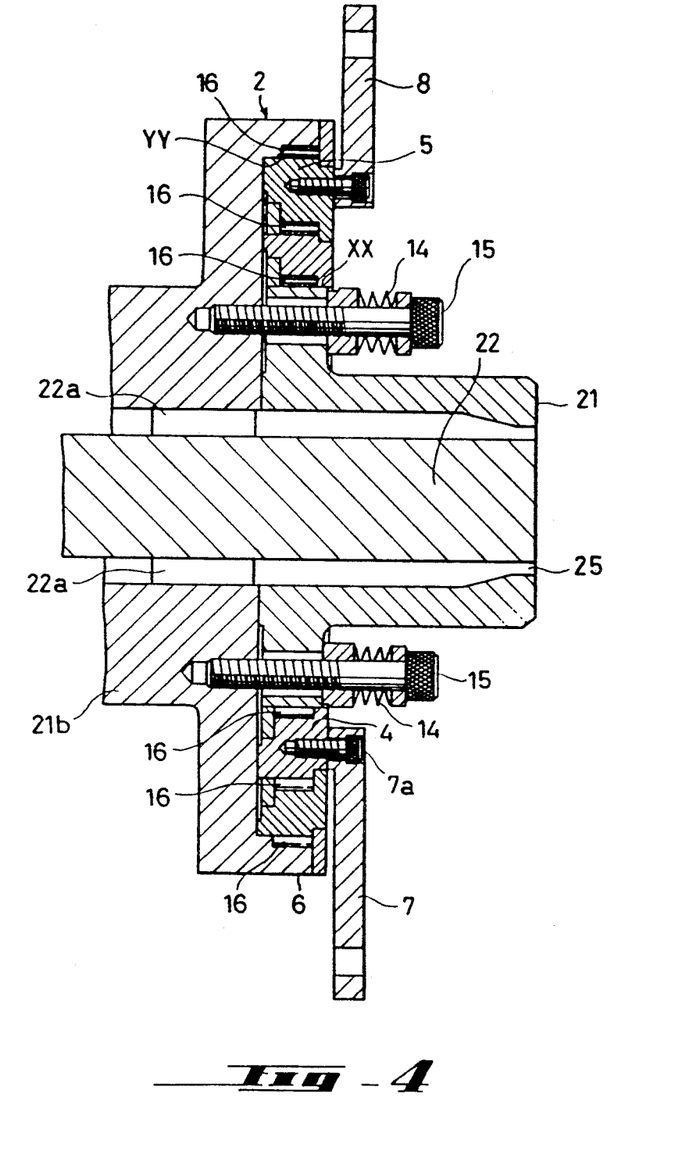
FIG. 4 is an enlarged side elevational sectional view of a main part of an apparatus shown in FIG. 1.

FIG. 4 shows a more concrete construction of the actuator 2, the die 21 and the mandrel 22. The die 21 is mounted to a forming machine body 21b by fastening screws 15 with the help of the spring force of compression springs 14. Namely, the die 21 is pressed against the molding machine body 21b by the compression springs 14. The pressing force of the compression springs 14 is strong enough to prevent the fluid material from entering the space between the die 21 and the forming machine body 21b. As is well known, the mandrel 22 is secured to the forming machine body 21b by a plurality of radial blades 22a provided on the mandrel 22 and spaced at a predetermined angular distance.

Between the inner and outer movable rings 4 and 5 and between the outer movable ring 5 and the base member 6 are provided rollers 16 which ensure a smooth independent rotation of the inner and outer movable rings 4 and 5. The rollers 16 are hollow and are preferably made of circular-cylinders (hollow circular needle rollers). The hollow circular needle rollers 16 are somewhat elastic and can be slightly deformed, so that they can absorb a possible difference in thermal expansion between the inner movable ring 4, the outer movable ring 5, the base member 6, and the die 21. Namely, these elements (inner movable ring 4, outer movable ring 5, base member 6, and die 21) are heated upon molding by the fluid material which is usually preheated prior to extrusion thereof from the extrusion annular opening 25 and is then naturally or positively cooled to hardened. The hollow circular needle rollers 16 slightly deform elastically to effectively absorb the difference in thermal expansion between the inner movable ring 4, the outer movable ring 5, the base member 6, and the die 21, when heated, to thereby ensure a smooth rotation of the inner and outer movable rings 4 and 5 and the die 21.

Thus, the inner and outer movable rings 4 and 5 can be smoothly and independently rotated by the respective driving devices, as constructed above.

Figures 5A, 5B, 5C:
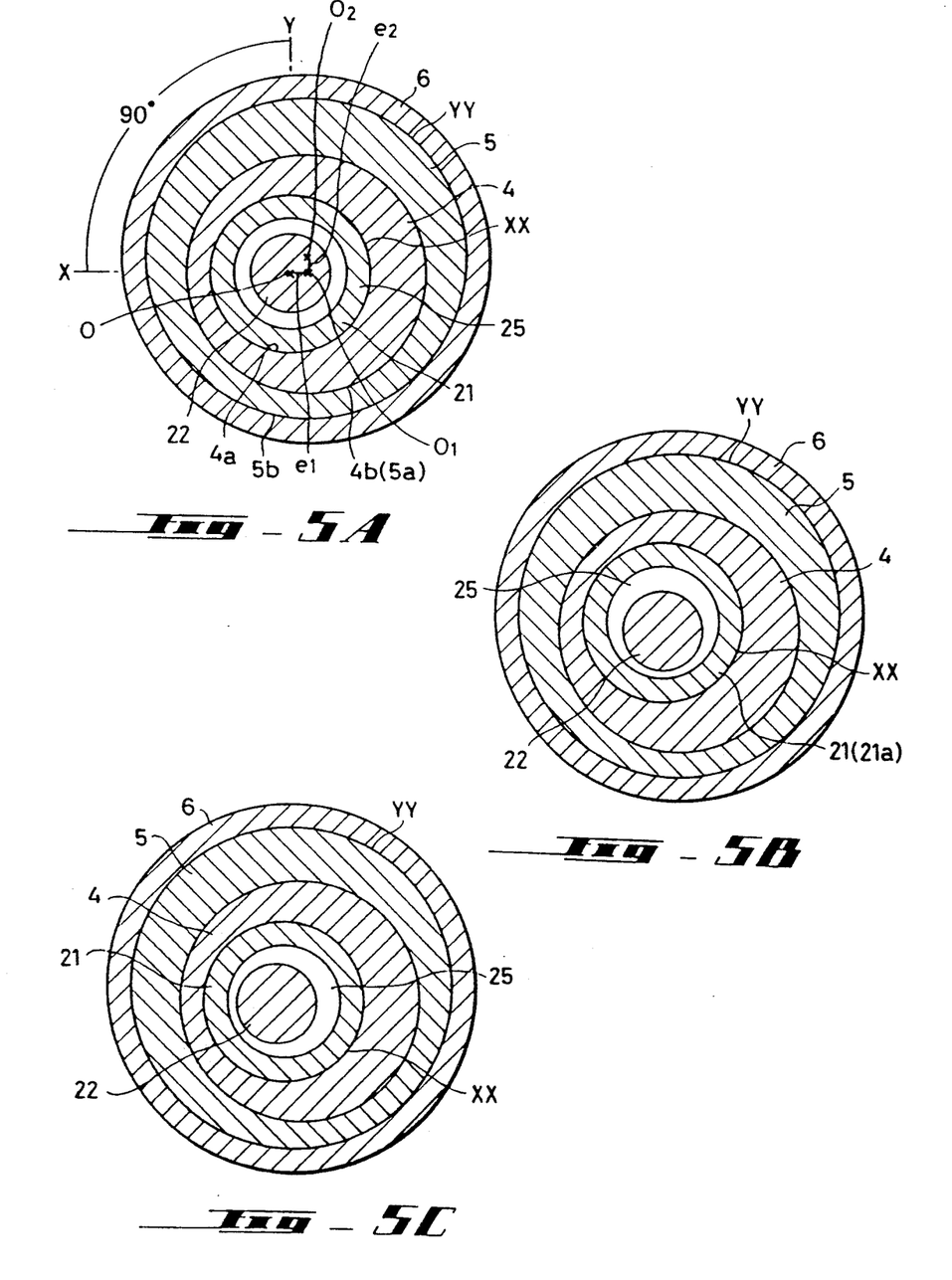
FIGS. 5A, 5B and 5C are schematic views of a main part of an apparatus for forming a bent pipe shown in FIG. 1, shown in different operational positions.

FIG. 5A shows a reference position of the inner and outer movable rings 4 and 5. In this reference position, the gap between the die 21 and the mandrel 22 is uniform throughout the circumference thereof. In FIG. 5A, the smallest (thinnest) thickness portion of the inner movable ring 4 is located left of center (with center 0 located o the mandrel 22) on the horizontal diameter X, whereas the largest (thickest) thickness portion of the inner movable ring 4 is located right of center on the same horizontal diameter X. Namely, the inner circle 4a defined by the inner diameter of the inner movable ring 4 has a center 0 identical to the center 0 of the mandrel 22 and the outer circle 4b thereof has a center 01 deviated from the center 0 by an eccentricity el in the rightward direction on the horizontal diameter X.

On the other hand, the outer movable ring 5 has the smallest thickness (thinnest) portion and the largest thickness (thickest) portion located on the upper portion and the lower portion of the vertical diameter Y, with respect to the center 01 of the outer circle 4b of the inner movable ring 4, respectively. Namely, the inner circle 5a defined by the inner diameter of the outer movable ring 5 has a center 0 identical to the center 01 of the outer circle 4b of the inner movable ring 4 and the outer circle 5b thereof has a center 02 deviated from the center 01 by an eccentricity e2 in the upward direction on the vertical diameter Y. In other words, in the reference position shown in FIG. 5A, the inner movable ring 4, having the eccentric outer peripheral surface and the outer movable ring 5, having the eccentric outer peripheral surface, have a phase difference of 90 degrees, so that the gap between the die 21 and the mandrel 22 is uniform throughout the circumference thereof. Note that the gap between the die 21 and the mandrel 22 and the eccentricities el and e2 are exaggerated for clarification in FIGS. 5A, 5B and 5C.

When only the outer movable ring 5 is rotated in a desired direction, from the reference position shown in FIG. 3 and FIG. 5A, with respect to the inner diameter of the stationary base member 6 in which the outer movable ring 5 is rotatably fitted, both the inner movable ring 4 and the die 21 which is fitted in the inner movable ring 4 can be moved in one specific direction by a displacement corresponding to the eccentricity between the inner and outer peripheral surfaces of the outer movable ring 5. For instance, when the outer movable ring 5 is rotated by 30 degrees in a counterclockwise direction in FIG. 5A, the inner movable ring 4 and the die 21 are brought into an operational position shown in FIG. 5B.

Similarly, when only the inner movable ring 4 is rotated, the die 21 is moved in a predetermined direction by a displacement corresponding to the eccentricity between the inner and outer peripheral surfaces of the inner movable ring 4, since the inner peripheral surface of the inner movable ring 4 rotates while being eccentric to the outer peripheral surface thereof. FIG. 5c shows another operational position in which the inner movable ring 4 is rotated by 30 degrees in a clockwise direction from the reference position shown in FIG. 5A.

The angular displacements of the inner movable ring 4 and the outer movable ring 5 are determined in accordance with the shape of the bent pipe to be formed, taking into account the eccentricities between the inner and outer peripheral surfaces thereof, and are usually about ±20 degrees and are preferable within about ±30 degrees at the maximum.

As can be understood from the above discussion, and with regard to the present invention, the width of the gap between the die 21 and the mandrel 22 in the circumferential direction of the annular extrusion opening 25 can be optionally adjusted to be irregular (non-uniform) by rotating the inner movable ring 4 and/or the outer movable ring 5 which has a different phase eccentricity, phase for example 90 degrees, from that of the inner movable ring 4, to move the die 21 in the radial directions.

Consequently, upon extruding the fluid material from the gap between the die 21 and the mandrel 22 to form a tubular body the die 21 is laterally (horizontally) moved to make the gap non-uniform, so that the extruded pipe varies in thickness, including a thick portion corresponding to a larger width of the gap and a thinner portion corresponding to a smaller width of the gap. As a result, the tubular body is continuously bent inwardly at the thinner thickness portion to form a bent pipe. Namely, the thicker width portion defines an outer side of the bent pipe.

When the die 21 is moved in the vertical direction, the bent pipe which is bent in the vertical direction can be obtained. Similarly, when the die 21 is moved in a direction at a desired angle with respect to the horizontal or vertical direction, a bent pipe which is accordingly bent in the corresponding direction can be obtained.

Any three-dimensional bent pipe can be obtained by a combined movement of the die 21 in the horizontal and vertical directions and an oblique direction inclined at a desired angle during the extrusion of the fluid material.

If a pipe must be three-dimensionally bent to correspond to the place to which the bent pipe is to be mounted, the movement of the die 21 is controlled by a numerical control to obtain the desired three-dimensional shape of pipe which is bent inwardly at the thinner thickness portion, so that the thicker thickness portion is placed on the outside of the bent pipe to provide a sufficient strength, without being subject to the reforming of the tubular blank by the mandrel.

Figure 7:
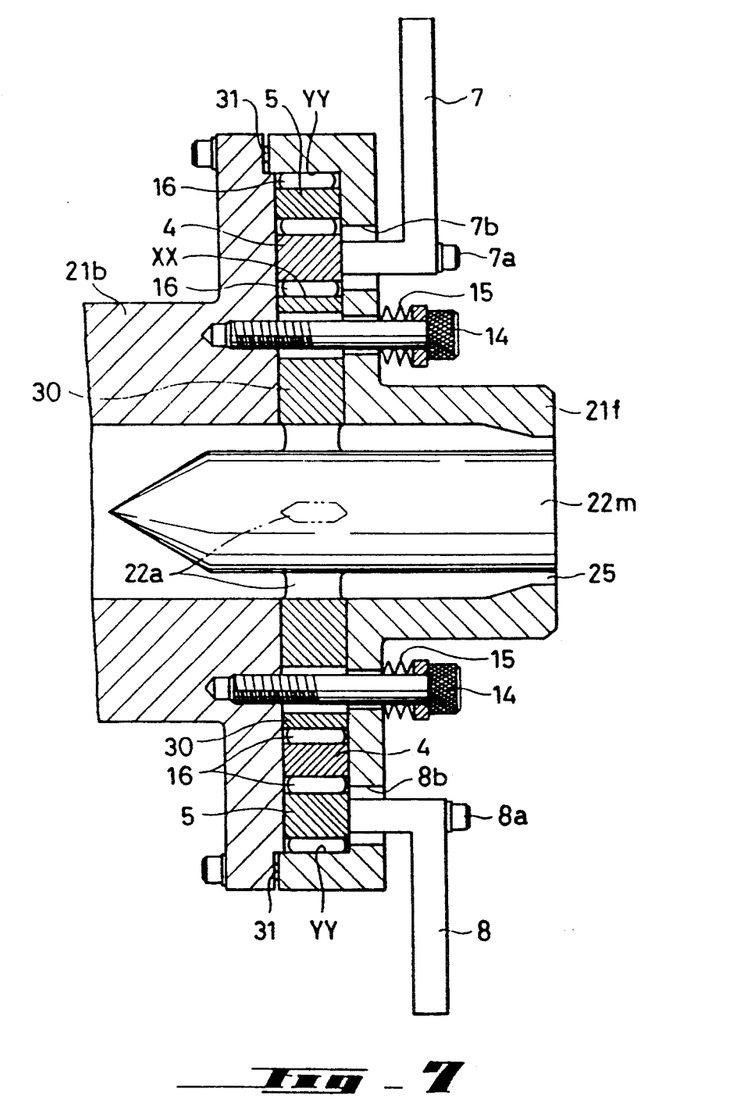

FIG. 7 shows another embodiment of the present invention, in which the die 21f is immovable and the mandrel 22m is movable, unlike the first embodiment in which the die 21 is movable and the mandrel 22 is immovable. In FIG. 7, the components corresponding to those of the first embodiment shown in FIGS. 1 through 6 are designated with the same reference numerals.

In the modified embodiment shown in FIG. 7, the movable mandrel 22 is made to be integral with a central ring 30 by a plurality of radial blades 22a which are spaced apart from one another. The central ring 30 has an outer peripheral guide surface XX of circular section which is coaxial to the center 0 of the mandrel 22m. The inner movable ring 4 is rotatably fitted on the outer peripheral guide surface XX of the central ring 30, and the outer movable ring 5 is rotatably fitted on the outer peripheral surface of the inner movable ring 4, similar to the first embodiment mentioned above. The outer movable ring 5 is also rotatably fitted in an inner peripheral guide surface YY of a circular section of the stationary die 21f. The inner movable ring 4 and the outer movable ring 5, are provided with first and second operational arms 7 and 8 secured thereto by set screws 7a and 8a, respectively. The first and second operational arms 7 and 8 extend loosely through holes 7b and 8b formed in the stationary die 21f and are secured to the inner and outer movable rings 4 and 5, respectively. The compression springs 15 coiled around the fastening screws 14 are screwed in the forming machine body 21b to press the stationary die 21f, the central ring 30, the inner movable ring 4 and the outer movable ring 5 against the forming machine body 21b in order to prevent leakage of the fluid material. The stationary die 21f is adjustable in the axial direction by guide pins 31 provided on the machine body 21b, but is immovable in the rotational direction.

Consequently, according to the second embodiment illustrated in FIG. 7, the rotation of the inner movable ring 4 and/or the outer movable ring 5 causes the central ring 30, and accordingly the mandrel 22m to move in the radial directions, varying the annular gap (extrusion opening 25) between the stationary die 21f and the mandrel 22m, as seen in the first embodiment. Namely, the same operation and effect as those of the first embodiment, illustrated in FIGS. 1 through 6 are achieved in the second embodiment illustrated in FIG. 7.

I claim:

1. A bent pipe forming apparatus for extruding and forming a fluid material into an annular member, having a central mandrel and a die defining an annular gap between the mandrel and the die, wherein:
   at least one of the mandrel and the die is supported to move in a direction perpendicular to an axis of the mandrel,
   the outer periphery of said movable one of said mandrel or die is provided with a circular guide surface integral therewith;
   an inner movable ring having inner and outer circular peripheries eccentric to each other rotatably fitted on said guide surface;
   an outer movable ring having inner and outer circular peripheries eccentric to each other rotatably fitted on the periphery of the inner movable ring;
   said outer movable ring provided with an outer peripheral surface which is rotatably fitted in a stationary circular guide surface; and
   driving means to independently move the inner and outer movable rings;
   wherein said driving means comprises operational arms connected to respective said inner and outer movable rings, screw rods hinged to respective said operational arms, reduction gear devices having rotating members in which said screw rods are engaged, a base member, and hinges which support said reduction gear devices on said base member.

2. A bent pipe forming apparatus according to claim 1, wherein a phase difference is provided between said inner movable ring and said outer movable ring.

3. A bent pipe forming apparatus according to claim 2, wherein said stationary guide surface surrounds said central mandrel.

4. A bent pipe forming apparatus according to claim 3, further comprising a forming machine body to which said central mandrel is secured through blades, wherein said die is movably supported by said forming machine body.

5. A bent pipe forming apparatus according to claim 4, further comprising spring means for pressing said die against said forming machine body to prevent the fluid material from leaking from a clearance between said die and said forming machine body.

6. A bent pipe forming apparatus according to claim 1, further comprising rollers provided between said outer peripheral surface of said movable one of said mandrel or die, and said inner movable ring, and also between said outer movable ring and said stationary guide surface.

7. A bent pipe forming apparatus according to claim 6, wherein said rollers are hollow circular cylindrical rollers.

8. A bent pipe forming apparatus according to claim 1, wherein each of said reduction gear devices comprises a numerical control motor, a worm driven by said numerical control motor, a worm wheel comprising said rotating member and having peripheral grooves, and rotors which are provided on said worm wheel to be engaged in the grooves of said worm.

9. A bent pipe forming apparatus according to claim 8, further comprising spring means for biasing said rotors toward said grooves of said worm.

10. A bent pipe forming apparatus according to claim 1, further comprising a movable central ring to which said central mandrel is secured.

11. A bent pipe forming apparatus according to claim 10, further comprising blades on said mandrel for securing said central ring to said central mandrel.

12. A bent pipe forming apparatus according to claim 11, wherein said central ring is provided with an outer peripheral guide surface on which said inner movable ring is rotatably fitted.

13. A bent pipe forming apparatus according to claim 12, wherein said die is located on said central ring.

14. A bent pipe forming apparatus according to claim 13, further comprising a forming machine body and spring means for pressing said die and said central ring against said forming machine body to prevent a leakage of the fluid material into a space between said die and said central ring as well as a space between said central ring and said forming machine body.

15. A bent pipe forming apparatus according to claim 1, wherein said operational arms are arranged in substantially opposite directions with respect to the center of said inner and outer movable rings, and said screw rods being arranged substantially parallel to each other.

16. A bent pipe forming apparatus for extruding and forming a fluid material into an annular member, said apparatus comprising a central mandrel defining an axis and a die defining an annular gap between the mandrel and the die, said apparatus comprising:
   means supporting at least one of said mandrel and said die for movement in a direction transverse to the axis of said mandrel;
   a peripheral surface of said movable one of said mandrel and said die comprising a circular guide surface;
   an inner movable ring, having inner and outer circular surfaces eccentrically disposed with respect to each other, said inner movable ring rotatably supported by said guide surface;
   an outer movable ring having inner and outer circular surfaces eccentrically disposed with respect to each other, said outer movable ring rotatably supported on the surface of said inner movable ring;
   said outer movable ring comprising an outer peripheral surface;
   a stationary circular guide surface disposed for rotatably supporting said outer peripheral surface of said outer movable ring; and
   means for independently moving said inner and said outer movable rings;
   wherein said means for independently moving said inner and outer movable rings comprises operational arms connected to respective said inner and outer movable rings, screw rods hinged to respective said operational arms, reduction gear devices having rotating members in which said screw rods are engaged, a base member, and hinges which support said reduction gear devices on said base member.

* * * * *

UNITED STATES PATENT AND TRADEMARK OFFICE
CERTIFICATE OF CORRECTION

PATENT NO. : 5,156,862
DATED : October 20, 1992
INVENTOR(S) : Takahisa KAWAGUCHI It is certified that error appears in the above-indentified patent and that said Letters Patent is hereby corrected as shown below:

```
    At column 2, line 50, change "devices," to ---devices---.
    At column 3, line 65, after "thereof" insert ---,---.
    At column 4, line 6, after "ends" insert ---thereof.  As a result of
the varying diameter, when the worm---.
    At column 4, line 11, after "17" insert ---,---.
    At column 4, line 17, after "18" insert ---,---.
    At column 4, line 68, change "o" to ---on---.
    At column 5, line 22, after "surface" insert ---,---.
    At column 6, line 1, delete "phase".
    At column 6, line 6, after "body" insert ---,---.
    At column 6, line 56, after "4" insert ---,---.
    At column 7, line 8, after "," insert ---thus---.
    At column 7, line 12, after "6" insert ---,---.
```

Signed and Sealed this

Twelfth Day of April, 1994

*Attest:*

BRUCE LEHMAN

*Commissioner of Patents and Trademarks*

*Attesting Officer*